F. A. BROADGATE.
WIND SHIELD ATTACHMENT FOR AUTOMOBILES.
APPLICATION FILED FEB. 5, 1917.
1,273,727.
Patented July 23, 1918.
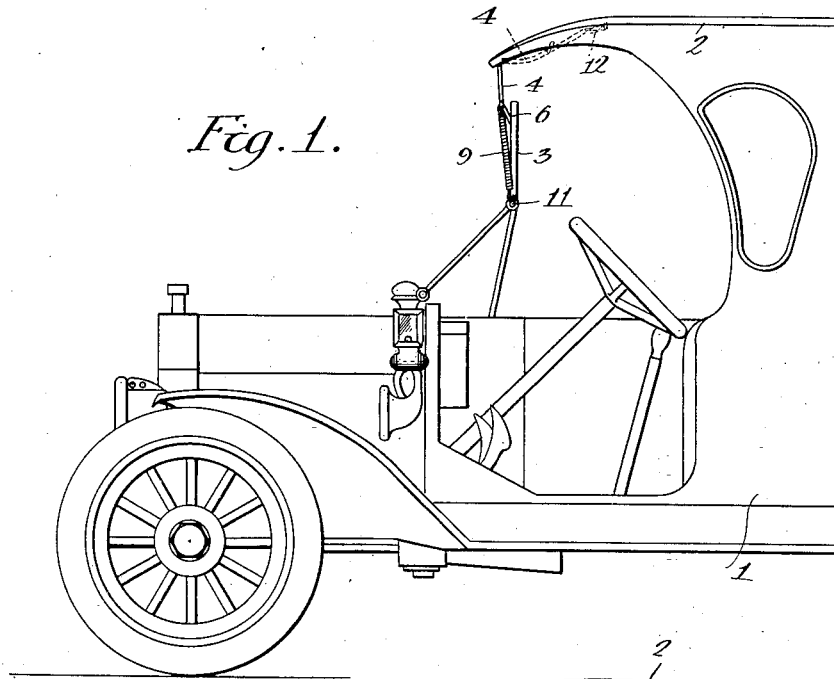
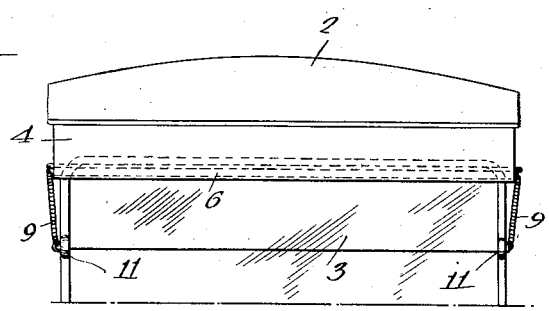
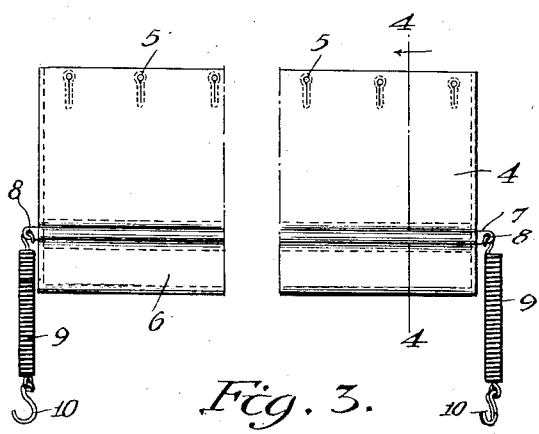
Inventor:
Fred A. Broadgate.

UNITED STATES PATENT OFFICE.

FRED A. BROADGATE, OF SPOKANE, WASHINGTON.

WIND-SHIELD ATTACHMENT FOR AUTOMOBILES.

1,273,727.     Specification of Letters Patent.     Patented July 23, 1918.

Application filed February 5, 1917. Serial No. 146,769.

*To all whom it may concern:*

Be it known that I, FRED A. BROADGATE, a citizen of the United States, residing at Spokane, in the county of Spokane and State of Washington, have invented certain new and useful Improvements in Wind-Shield Attachments for Automobiles, of which the following is a specification.

This invention relates to new and useful improvements in wind shield attachments for automobiles and more particularly to an apron or weather protection for attachment to the top and engagement with the wind shield. The primary object of the invention is to provide a device of this character which is adapted to be applied to use in cases where there is a space provided between the top of the automobile and the upper portion of the wind shield, whereby to protect the occupant of the vehicle in wintry and rainy weather.

A further object of the invention resides in providing a flap or the like which may be quickly and readily applied to the top of the vehicle and yieldingly engaged with the wind shield, whereby to cover the opening between the top and the wind shield and at the same time accommodate movement of the top during the travel of the vehicle.

Still another object of the invention resides in providing an apron or the like having a rod applied thereto and extending its full length to the ends of which are secured coil springs for engagement with the wind shield.

A still further object resides in so securing the rod to the apron that a portion of the latter is directed inwardly against the upper portion of the wind shield.

A still further object resides in providing a device of this character which is simple and durable in construction, inexpensive to manufacture and one which will be very efficient and useful in operation.

With these and other objects in view, my invention consists in the novel features of construction, combination and arrangement of parts as will be hereinafter referred to and more particularly pointed out in the specification and claims.

In the accompanying drawing, forming a part of this application:—

Figure 1 is a side elevation of an automobile delivery wagon having my improved device applied to use thereon;

Fig. 2 is a fragmentary front elevation thereof;

Fig. 3 is a detailed front elevation of a device constructed in accordance with my invention and removed; and Fig. 4 is a vertical section therethrough as seen on the line 4—4 of Fig. 3.

In describing the invention, I shall refer to the drawing in which similar reference characters designate corresponding parts throughout the several views and in which 1 designates an automobile delivery wagon, but it will be understood that this device may be applied to use in connection with other automobiles of any desired type. The vehicle 1 is provided with a top 2 and a wind shield 3, it being obvious that space is provided between the forward edge of the top 2 and the upper end of the wind shield, as clearly shown in Fig. 1 of the drawing. Such a space is usually provided in connection with delivery wagons in view of the permanent top, but in the use of the very latest types of automobiles, the tops of touring cars are secured direct to the wind shield so that a device of this character would not be applicable. However, it is a well known fact that in the older types of automobiles, of the touring and roadster design, such a space between the forward edge and top of the wind shield is provided, the top being held down in position by means of stay straps and the like. My invention is adapted for use in connection with such vehicles.

My invention consists of an apron or flap 4, of rectangular design and preferably formed of leather, the same being provided at its upper edge with a plurality of button holes or other engaging devices 5 whereby to secure the same to the inner face of the top immediately adjacent the forward edge of the latter, as clearly shown in Fig. 1. This apron 4 is preferably stitched along its edges for reinforcement purposes and the lower portion of the same is folded upon itself and stitched to form the flap portion designated in the drawing as 6. Stitched between the folds of the apron 4 adjacent the upper portion of the flap 6 is a metallic rod 7 which extends the full width of the apron and projects beyond its edges, as clearly shown in Fig. 3, the extreme outer edges of said rod being provided with eyes 8. The flap 6 is stitched above and below the rod 7 to form a pocket or the like therefor and the lines of stitching above and below the rod tend to converge toward the center of the rod, so as to provide a pocket which is narrower at its center than at its ends. By so constructing the apron, the lower flap portion 6 thereof is directed inwardly so as to contact with the outer face of the upper portion of the wind shield when the device is applied to use, as shown in Fig. 1 of the drawing.

Engaged with the eyes 8 at the ends of the rod 7 are the coil springs 9, the lower ends of which have the hook members 10 engaged therewith and these springs are adapted to be extended and the hooks 10 engaged with the adjusting nuts or the like 11 provided at the central portion of the wind shield. The apron or protector 4 is thus drawn taut and yieldingly held in position, so that the movements of the top during the travel of the vehicle will be accommodated without affecting the flap of the wind shield proper.

It will be seen that by providing a device of this character the driver and other occupants of the vehicle may be protected from the weather and the device will be quickly and readily removed when desired. When not in use I prefer to have the apron directed upwardly against the top as shown in dotted lines in Fig. 1 of the drawing. Hook members or the like 12 are preferably provided on the inner face of the top with which may be engaged the hooks 10 on the ends of the springs 9, so that this device may be held in its inoperative position. When so positioned, the apron may be used as a pocket or the like for packages as appears obvious.

From the foregoing description it will be seen that I have provided a simple, efficient and inexpensive means for carrying out the objects of the invention.

While I have particularly described the elements best adapted to perform the function set forth, it is obvious that various changes in the form, proportion and in the minor details of construction may be resorted to without departing from the spirit or sacrificing any of the principles of the invention.

Having thus described my invention, what I believe to be new and desire to secure by Letters Patent, is:—

1. The combination with a top of an automobile, and a wind shield having its upper edge spaced slightly below said top; of a protecting apron removably secured at its upper edge to said top and depending therefrom forwardly of the wind shield, said apron being provided adjacent its lower edge with a transversely extending pocket, a member arranged in said pocket and projecting beyond the side edges of the apron, the extreme lower portion of said apron forming a flap adapted to be directed inwardly against the wind shield, and means for yieldingly securing said apron to the wind shield.

2. The combination with the top of an automobile and a wind shield having its upper edge slightly spaced below the forward edge of said top; of a protecting apron removably secured at its upper edge to the forward edge of said top and depending therefrom forwardly of said wind shield, said apron being provided with a transversely extending pocket adjacent its lower edge, a bar arranged in said pocket and projecting slightly beyond the side edges of the apron, said pocket being constructed smaller toward its central portion, whereby to normally direct the lower portion of the apron inwardly against the wind shield, and spring members engaged with the outer ends of said bar and said wind shield to yieldingly retain the flap in place with respect to the latter.

In testimony whereof I affix my signature.

FRED A. BROADGATE.